United States Patent [19]

Ohta et al.

[11] Patent Number: 4,852,076

[45] Date of Patent: Jul. 25, 1989

[54] OPTICAL INFORMATION RECORDING AND REPRODUCING DISC EMPLOYING A FILM HAVING THERMALLY CHANGEABLE OPTICAL CHARACTERISTICS

[75] Inventors: Takeo Ohta, Nara; Tatsushi Nakamura; Shizuhiko Tanigawa, both of Moriguchi, all of Japan

[73] Assignee: Matsushita Electric Industrial Co., Ltd., Kadoma, Japan

[21] Appl. No.: 62,425

[22] Filed: Jun. 16, 1987

Related U.S. Application Data

[63] Continuation of Ser. No. 629,621, Jul. 11, 1984, abandoned.

[30] Foreign Application Priority Data

Jul. 14, 1983 [JP] Japan ................................. 58-128605
Jul. 14, 1983 [JP] Japan ................................. 58-128645

[51] Int. Cl.⁴ ........................... G11B 7/00; G11B 7/24
[52] U.S. Cl. .................................. 369/275; 369/277; 369/284
[58] Field of Search ............... 369/275, 277, 280, 283, 369/284, 286, 288, 272, 109, 100, 279

[56] References Cited

U.S. PATENT DOCUMENTS

| 4,385,303 | 4/1981 | Akahira et al. | 369/280 |
| 4,385,372 | 5/1983 | Drexler | 369/109 |
| 4,417,331 | 11/1983 | Takaoka et al. | 369/284 |
| 4,481,620 | 11/1984 | Murakami | 369/275 |

FOREIGN PATENT DOCUMENTS

| 0102338 | 6/1983 | Japan | 369/275 |
| 0102347 | 6/1983 | Japan | 369/275 |

Primary Examiner—Alan Faber
Assistant Examiner—Robert A. Weinhardt
Attorney, Agent, or Firm—Spencer & Frank

[57] ABSTRACT

An optical information recording and reproducing disc information has a substrate in the surface of which are formed signal recording grooves and cue signal recording pits. A light-absorbing thin film is formed on the surface of the substrate, the optical characteristics of the light-absorbing film being changeable thermally through irradiation by a light beam. The pitches of the grooves and pits, as well as the widths of the grooves and pits, are determined to meet specific conditions in relation to the diameter of the laser beam which is used for recording and reproduction of the signals. In addition, the depths of the grooves and pits are determined suitably in relation to the wavelength of the laser beam. With this arrangement, it is possible to attain a high quality of reproduction of information from the disc.

2 Claims, 2 Drawing Sheets

4,852,076

OPTICAL INFORMATION RECORDING AND REPRODUCING DISC EMPLOYING A FILM HAVING THERMALLY CHANGEABLE OPTICAL CHARACTERISTICS

This application is a continuation, of application Ser. No. 06/629,621, filed July 11th, 1984, now abandoned.

BACKGROUND OF THE INVENTION

The present invention relates to a disc for recording and reproducing optical information, suited to use for various apparatus such as video and audio apparatus for recording and reproducing video and audio signals, office automation systems for filling large-volume data such as still pictures, documents and the like, and computers for processing and storing various information.

As is well known, a disc for recording and reproducing optical information has pits corresponding to the information recorded therein. In this disc, the minimum reflectivity of the pit is obtained when the pit depth is a quarter ($\frac{1}{4}$n) of the wavelength λ of the light beam used. In a disc of the type in which the information is recorded in the recording tracks in the form of grooves and is read out from the same, the quality of the signals is impaired if the groove depth is selected to the $\lambda/4n$. In another known disc, the groove depth of the recording tracks is selected to be $\lambda/8n$, while the cue signal recording portion which is formed beforehand in the disc, e.g., the address signal portion, has a pit depth of $\lambda/4n$. This disc, however, is impractical in that the groove forming process requires two steps of depth control.

SUMMARY OF THE INVENTION

Accordingly, it is a primary object of the invention to provide a disc for recording and reproducing optical information, which is improved to eliminate the mutual interference between the servo signal and the recording signal, thereby attaining high quality of reproduction of both the signals recorded in the recording grooves and the cue signals recorded in the pits.

To this end, according to the invention, there is provided a disc for recording and reproducing optical information having a substrate which are formed therein with recording grooves for recording information signals and recording pits for recording cue signals peculiar to the disc, and a light absorbing thin film covering the substrate, the optical characteristics of the thin film being changeable thermally through irradiation by a beam, wherein the improvement comprises that the pitches of the grooves and the pits are not greater than twice as large as the diameter of the spot of a laser beam used for the reproduction; that the depths of the grooves and pits are not greater than $\lambda/8n \pm 10\%$, where λ represents the wavelength of the laser beam; and that the widths of the grooves and pits range between 60 and 80% of the diameter of the spot.

The above and other objects, features and advantages of the invention will become clear from the following description of the preferred embodiments taken in conjunction with the accompanying drawings.

DESCRIPTION OF THE PREFERRED EMBODIMENTS

Figure 1:
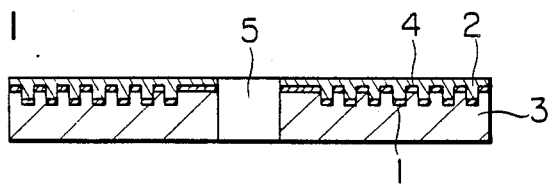
FIG. 1 is a sectional view of an embodiment of the disc in accordance with the invention, having a light-absorbing thin film.

Referring first to FIG. 1 showing an embodiment of the disc of the invention for recording and reproducing optical information, the disc has a substrate 3 in which are formed grooves constituting the recording tracks and pits 2. The substrate 3 is covered by a light-absorbing thin film 1 the optical characteristics of which are changed thermally by irradiation by a laser beam. The objective optical information is recorded in the grooves through irradiation by the laser beam, while the cue signals peculiar to the disc, e.g., track address signals coded from the video or audio signal, and signals representing other data, are stored in the pits. Thus, the grooves constituting the recording tracks produce a tracking signal output corresponding to the laser beam spot. The depth of the grooves is selected to be about $\frac{1}{8}$n of the wavelength of the laser beam, because this depth region provides a greater quantity of reflected light than the grooves of $\lambda/4n$ depth to thus facilitate the detection of the recorded signals.

On the other hand, the pit can produce a signal output which is usually greater than the signals reproduced from the grooves, due to a change in the reflected light quantity attributable to diffraction. More specifically, the waveforms of the detected signals are changed in accordance with various factors such as the spot diameter, track pitch, and widths and depths of the grooves and pits.

The illustrated embodiment is a disc having a protective layer 4, a central hole 5, and a small track pitch, i.e., a high groove density, suited to recording/reproduction of information and reproduction of pit signals by means of a semiconductor laser beam, and improved to avoid any distortion of the waveforms of detected signals reflected or diffracted by the bottom surfaces of the pits, the upper surfaces of the lands between adjacent tracks and the walls of adjacent tracks and pits.

Figure 2A:
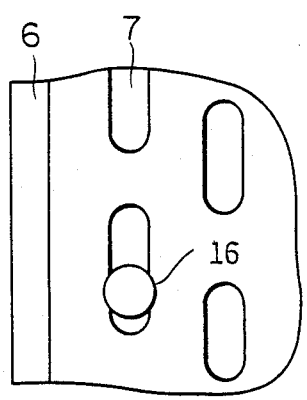
FIGS. 2a and 2b are a plan view and a sectional view of a part of the disc.
Figure 2B:
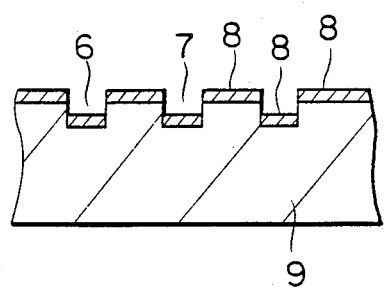
Figure 3:
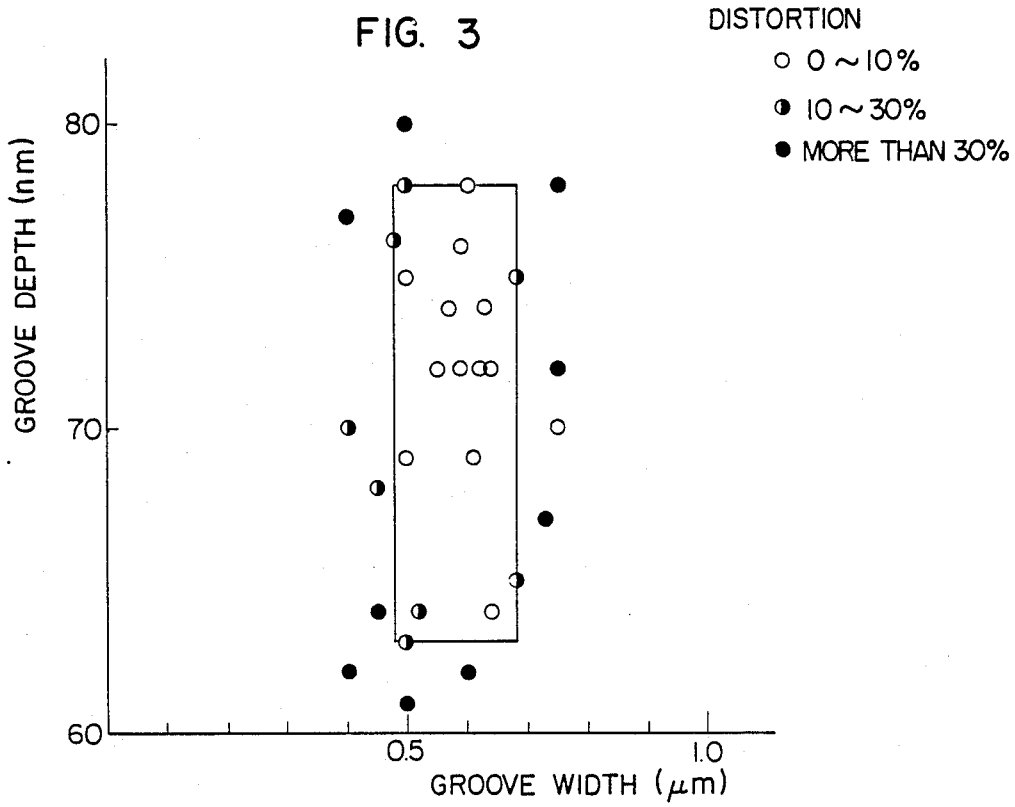
FIG. 3 is an illustration showing the relationship between the depths and widths of the recording grooves and the pits.

In this embodiment, a structure having a PMMA resin plate covered with an ultraviolet-ray set resin layer for groove forming is used as the grooved substrate. The track grooves and the pits are shown in plan and in section in FIGS. 2a and 2b, respectively. More specifically, a track groove for recording the information is denoted by a numeral 6, while the pits for recording address signals are denoted by a numeral 7. The substrate is designated by the numeral 9. The light absorbing thin film 8 is made of a material consisting mainly of a tellurium oxide expressed by $TeO_x$ ($0 < x < 2$).

A semiconductor laser beam producing a spot 16 and having a wavelength λ of 830 nm is used as the laser beam for recording and reproduction. The laser beam was focussed to a spot having a diameter of 0.83 μm. The pitch is 1.65 μm, while the cross-talk is not smaller than 40 dB. The level of the reproduced signal from the groove is increased as the groove depth is decreased and as the groove width is increased. In the signal reproduction from the pit, on the other hand, the detection of the signal is conducted by making use of diffraction due to the phase difference of beams reflected and diffracted by the bottom, top and wall surfaces of the pit. Therefore, the level of the reproduced signal is increased as the pit depth approaches the value of $\lambda/4n$. As to the pit width, there has been such a possibility that the level of the reproduced signal is increased as the pit width is decreased, due to a certain relationship between the pit width and the spot diameter.

In the known disc, distortions of waveforms were found in every region, i.e., in the grooves and pits, in addition to the change in the amplitude of the reproduced signal.

This distortion of waveform is closely related to the diameter of the reproducing beam spot and the pit length. Namely, when the reproducing beam spot passes the leading and trailing ends of a pit, the reproduced output signal is distorted due to a transient phenomenon. This distortion is more serious when the pit length is small because, in such a case, the distortion occupies the greater part of the reproduced output signal as a whole.

In this embodiment, the pit length is 3 to 10 $\mu$m, while the laser beam having a reproducing wavelength of 830 nm is focussed into a spot of 0.83 $\mu$m by means of a lens having an N.A. value of 0.5. Thus, the ratio of the spot diameter to the pit length is about 30 to 10%.

A test with the disc of this embodiment proved that distortion of the wavelength can be avoided when the groove and pit depths range between 63 and 77 nm, and when the groove and pit widths range between 0.48 and 0.68 $\mu$m.

The depths and widths of the grooves and pits may vary depending on the wavelength of the laser beam, the spot diameter and the track pitch. It was confirmed that, in order to eliminate the diffractive distortion of the light reflected by various portions, it is preferred that the following conditions be met:

depth: $\lambda/8n \pm 10\%$ width: $D\mu\phi x$ (60% to 80%)

pitch: $<2D$ where, n and D represent, respectively, the refractive index of the substrate and the spot diameter.

Figure 4:
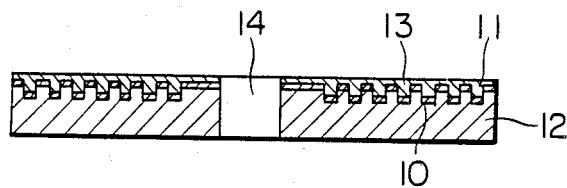
FIG. 4 is a sectional view of another embodiment of the disc of the invention.

Another embodiment of the invention will be described hereinunder with reference to FIG. 4. The disc of this embodiment has a substrate 12 provided with grooves 11 and pits, and coated with a light-absorbing thin film 10 the optical characteristics of which are changeable thermally through irradiation by a laser beam. A reference numeral 13 designates a closely contacting protective layer, while 14 designates the central hole of the disc. The grooves constitute the signal recording portion in which the desired signals are recorded through irradiation by a laser beam, and serve also to provide the tracking servo output. On the other hand, the pits are intended for storing various cue signals peculiar to the disc, such as audio, video and coded data signals. Thus, the pits are used only for the reproduction of cue signals, and are not for the recording or writing of information.

In this embodiment, the light-absorbing thin film 10 is made of a tellurium oxide which is expressed by, for example, TeOx (0<2). This film experiences change in the refractive index and absorption coefficient as a result of heating by a laser beam, so that it can store the information in the form of density variations. Therefore, the undesirable interference between the reproduced output signal and the servo signal can be suppressed as compared with a recording system generally referred to as "phase-difference recording", e.g., a perforation type recording system.

Figure 5:
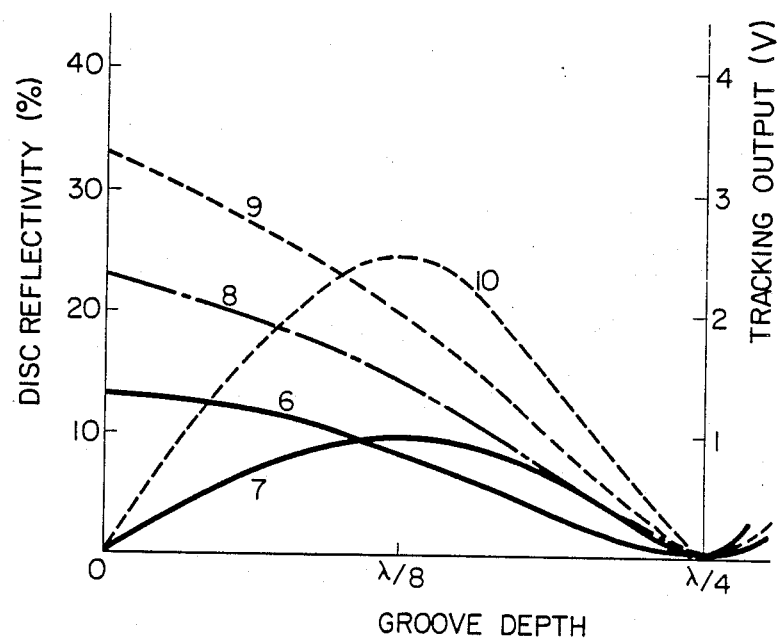
FIG. 5 is an illustration of certain characteristics of the disc as shown in FIG. 4.

It is to be noted, however, that the reflectivity is changed as a result of the change in the refractive index and the absorption coefficient, resulting in a shifting of the servo signal level. FIG. 5 shows how the tracking output and the disc reflectivity are changed as a result of the recording, for various values of the groove depth.

In this embodiment, the change in the reflectivity as a result of recording is taken into consideration to equalize the levels of the servo output before and after the recording, thereby to ensure the high quality of the recording/reproduction signals.

This embodiment employs, as the grooved substrate, a PMMA resin plate covered by an ultra-violet ray set resin layer for groove forming. Grooves of 0.60 $\mu$m wide and 700 Å are formed at a pitch of 1.65 $\mu$m. The light-absorbing thin film 10 is made of a material mainly consisting of a tellurium oxide which is expressed by TeOx (0<2).

A curve 6 in FIG. 5 shows the reflectivity of this film in the state before recording. It will be seen that the reflectivity is about 13% in the flat land portion devoid of the groove and about 8% in the groove of $\lambda/8n$ depth.

The reflectivities of this film in the state after the recording are about 23% in the flat portion and about 14% in the groove of $\lambda/8n$ depth, as shown by a curve 8 of the same Figure. Thus, the variance of the reflectivity in the groove of $\lambda/8n$ depth caused by the recording is as small as about 6%, which is the minimum practical value. Namely, the disc cannot be practically used if this change should fall below 6%.

The reflectivity in the recording groove of $\lambda/8n$ depth in the state before the recording is about 8% and the tracking output in this state is about 1 V as shown by the curve 7. This is the minimum practical value for obtaining an output usable valid for tracking control.

There is a thin film which exhibits, in the prerecording state, high reflectivities which approximate well to the curve 8, i.e., reflectivities of 23% in the flat area and 14% in the groove portion of $\lambda/8n$ depth. This thin film, shown by curve 9, exhibits reflectivities which are as high as 33% in the flat area and 22% in the groove of $\lambda/8n$ depth, in the post-recording state. This thin film provides a tracking output which is shown by a curve 10. It will be seen that a large tracking output of 2.5 V at the maximum is obtainable.

In FIG. 5, the tracking output experiences about 270% variance between the curve 6, showing the minimum reflectivity, and the curve 9, showing the maximum reflectivity.

In general, a stable follow-up control in a track servo system is attainable when the variance of the tracking output is not greater than 300%. In the described embodiment, by selecting the minimum value of the reflectivity of the groove before the recording to be 8% and the maximum value of the same to be 14%, the variance of the tracking output can be made less than 300% which is the practical limit for attaining stable control. It is, therefore, possible to obtain a disc capable of performing a stable recording/reproduction and tracking servo control.

As will be understood from the foregoing description, the invention provides a disc for recording and reproducing optical information, wherein the widths and depths of signal recording/reproducing grooves and cue signal recording pits, as well as the track pitch, are specified as stated above, so as to eliminate undesirable distortion of the waveforms of the reproduced signals and, hence, a signal detection with a high S/N ratio. Furthermore, the tracking stability and the speed of access to the track address are enhanced advantageously.

In addition, by selecting the reflectivity to the laser beam in a range between 8 and 14%, it is possible to obtain a large ratio as between the post-recording reflectivity and the pre-recording reflectivity, which in turn ensures the high quality of the reproduced signals. In addition, the ratio between the minimum reflectivity in the pre-recording state and the maximum reflectivity in the post-recording state can be maintained at less than 300% so that the tracking and focussing are advantageously stabilized.

Although the invention has been described by reference to specific terms, it is to be noted here that the described embodiments are not exclusive and various changes and modifications may be imparted thereto without departing from the scope of the invention which is limited solely by the appended claims.

What is claimed is:

1. In a disc for recording and reproducing optical information having a substrate preformed therein with grooves and pits and a light absorbing thin film covering said substrate, the optical characteristics of said thin film being changeable thermally through irradiation by a beam, the improvement wherein the pitches of said grooves and said pits are not greater than 1.7 μm; the depths of said grooves and pits are in the range 63 nm to 77 nm; the widths of said grooves and pits are between 0.48 μm and 0.68 μm; the widths of said pits are not greater than 50% of said pitches, not less than 60% of the diameter of a spot irradiated on said substrate by said beam, and not greater than the widths of said grooves; and the ratio of said spot diameter to the lengths of said pits is between 0.1 and 0.3.

2. A disc for recording and reproducing optical information according to claim 1, wherein said beam is a laser beam having a wavelength of about 830 nm and the reflectivity of the film surface on said grooves to said laser beam applied from the side of said substrate ranges between 8 and 14%.

* * * * *